March 21, 1939. H. R. GIBBONS ET AL 2,150,893
JOURNAL BOX
Original Filed June 20, 1933 3 Sheets-Sheet 3

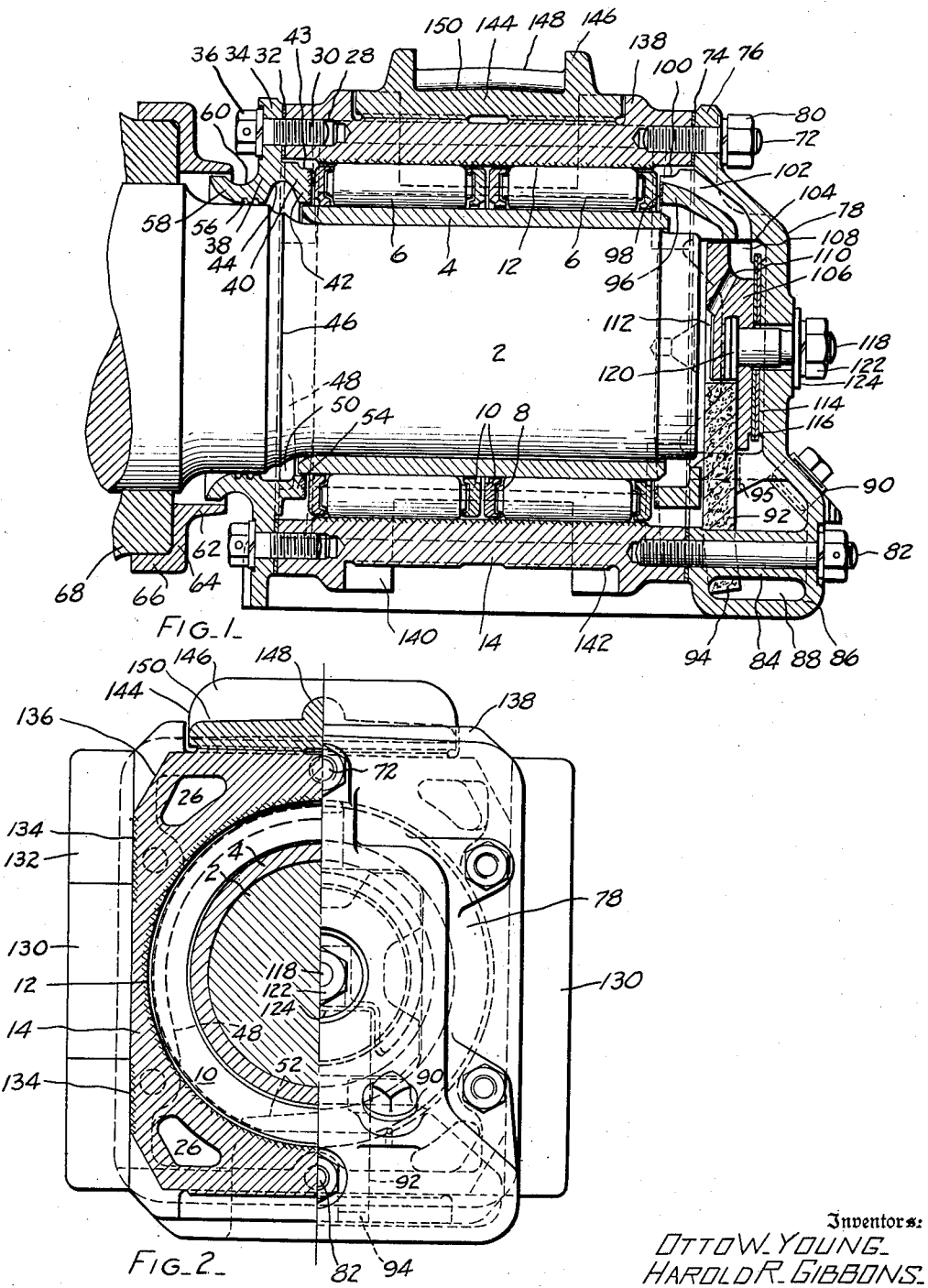

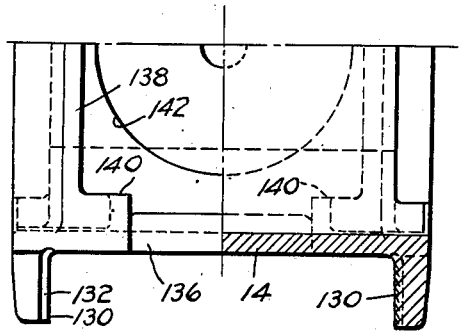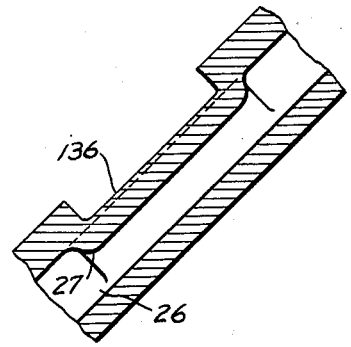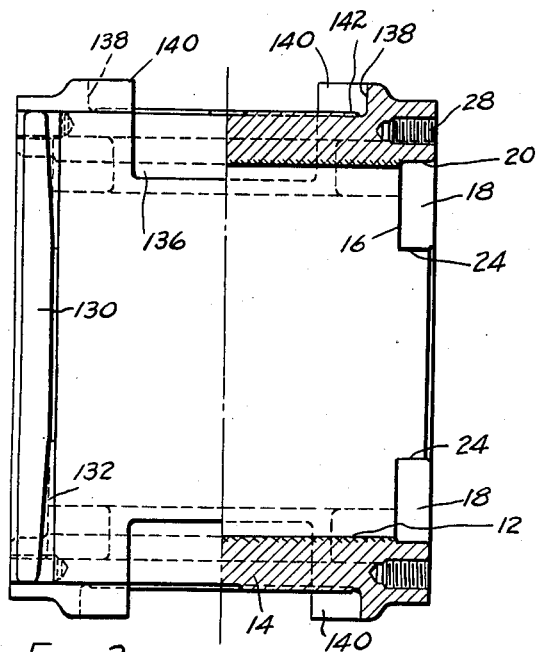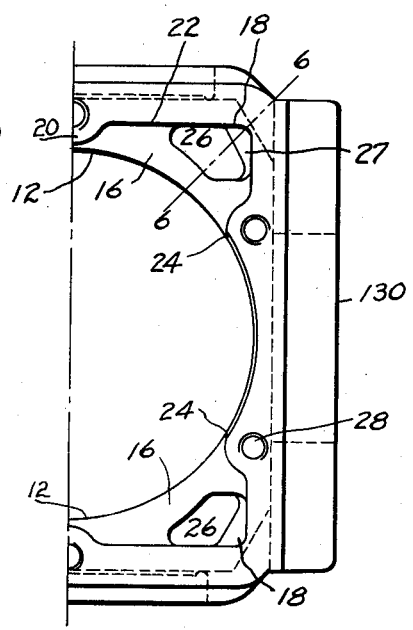

Inventors:
OTTO W. YOUNG
HAROLD R. GIBBONS
BY Gales P. Moore
their Attorney.

Patented Mar. 21, 1939

2,150,893

UNITED STATES PATENT OFFICE 2,150,893

JOURNAL BOX

Harold R. Gibbons, Chatham, and Otto W. Young, East Orange, N. J., assignors to General Motors Corporation, Detroit, Mich., a corporation of Delaware Original application June 20, 1933, Serial No. 676,662. Divided and this application March 23, 1936, Serial No. 70,240

5 Claims. (Cl. 308—41)

This invention relates to journal boxes and is a division of our application Serial No. 676,662 filed June 20, 1933. An object of the invention is to provide improved lubricating means for journal boxes. Another object is to provide efficient means for conducting excess lubricant from the journal bearing surface to end thrust surfaces.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a vertical longitudinal sectional view.

Fig. 2 is one half an end view and one half a cross section of Fig. 1.

Fig. 3 is one half side view and one half vertical section of the box body.

Fig. 4 is an end view of one half of the box body.

Fig. 5 is one half plan view and one half horizontal section of the box body.

Fig. 6 is a sectional view at a corner on line 6—6 of Figure 4.

Figures 8, 9:
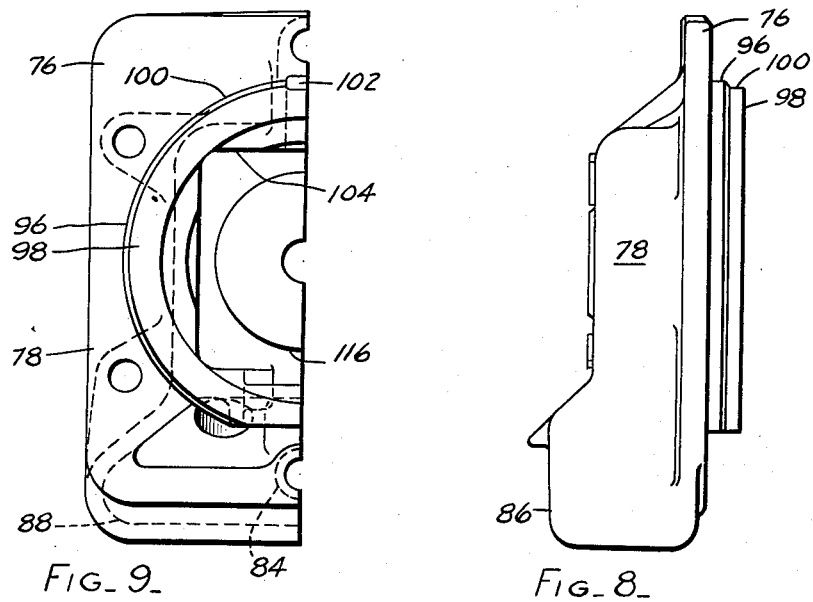
Fig. 8 is a side view of the end cap.
Fig. 9 is an inside elevation of one half of the end cap.
Figure 7:
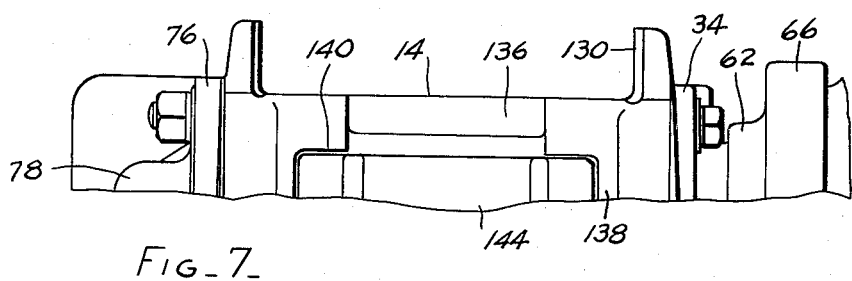
Fig. 7 is a partial plan view.

The numeral 2 indicates a shaft or axle carrying a raceway sleeve 4 for antifriction bearings having rolling elements 6. The rolling elements are preferably cylindrical with reduced ends 8 entering channels in a cage having end rings 10. The rollers run on a carburized or otherwise hardened surface 12 in the bore of an axle box 14. The box is symmetrical about two intersecting axes so that it can be inverted up and down or reversed end for end. The inversion utilizes the bearing surfaces at both top and bottom where the maximum load will occur and the reversal end for end utilizes both sets of pedestal flanges to take outward thrust shocks. The hardened surface 12 is desirably peripherally continuous but can be considered as comprising a bearing surface at both top and bottom.

As best shown in Figs. 3 and 4, the bearing surface 12 at both its upper and lower portions extends unbroken to flat end walls 16 which form the inner walls of recesses or cavities 18 at the corners of the box. Each upper and each lower pair of corner recesses join at the center as indicated at 20 where the recesses are shallow radially. Each recess widens outwardly to the box corner, as along the line 22, and then narrows again to the point 24, and between such adjacent points 24, the bearing surface is unbroken except at a terminal chamfer. Longitudinal passages 26 through all corners of the box connect the opposite recesses and such passages and recesses (or whichever ones are at the bottom) form connected lubricant receptacles. The passages 26 are widest at the ends but become somewhat narrower medially as at 27 where the corners of the box are slabbed off on an incline.

Both ends of the box have a series of symmetrically located openings 28 which are tapped to receive tightly the threads of fastening bolts for end closures. Such bolts 30 at the rear or inner end of the box are or may be all alike and extend through a gasket 32 and a flange 34 held by lock washers and nuts 36. The flange is part of an end closure or sealing ring 38 which has a generally annular extension 40 projecting into the box where its flat terminal face 42 is hardened and guides the adjacent cage ring 10. Externally the projection 40 has a relief groove 43 to receive surplus oil from the surface 12. Internally the ring 38 has a groove 44 to receive oil thrown from a rib 46 on the axle. The upper part of the internal groove 44 is continuously arch-shape in cross section but its lower portion has drain walls 48 extending to the upper edges of exit openings 50 which are located at the sides. Oppositely inclined bottom walls 52 lead from a point directly under the axle to the openings 50 and drain oil to the openings. This construction leaves a dam or obstruction 54 which prevents oil being splashed from the box to the low point of the axle when the box shifts endwise on curves. The sealing ring has grease grooves at 56 and a curved flange 58 forming an external drain groove 60 overhung by a flange 62 on a guard ring 64 which has a second flange 66 pressed on a wheel hub 68.

At the front or outer end of the box, fastening bolts 72 extend through a gasket 74 and a flange 76 on a closure or end cap 78 and receive nuts 80. The lowest bolt indicated at 82 is longer than the others and traverses a circular reinforcing wall or sleeve 84 in an enlargement 86 of the end cap, such enlargement forming a lubricant reservoir 88 filled at the plug 90 and supplementing and open to the box and its reservoir. A wick 92 to lubricate the end of the axle has its lower end bifurcated to form legs 94 straddling the sleeve 84. The wick extends upwardly through a vertical slot 95 in a projection of the end cap, such cap having also a substantially annular projection 96 which enters the box and has a hardened flat terminal face 98 to guide the adjacent cage ring 10. The projection also has an external groove 100 outside of the guide face 98 and open to the bearing surface 12 to receive excess oil working axially from the roller bearings. At the top of the projection, there is also an inclined passage 102 partitioned off from the axle to conduct some of such excess lubricant to a polygonal recess 104 containing a thrust block 106. The thrust block has a top recess or reservoir 108 receiving the oil from the exit end of the passage 102 and draining it to an inclined passage 110 leading to a center recess 112 above the wick and opposite the end of the axle. This oil thus aids the wick in lubricating the thrust faces of the axle and thrust block. The thrust block is backed up by spacing plates 114 engaging a circular face or pad 116 on the end cap. A clamping bolt 118 has a head 120 embedded in the thrust block and a clamping nut 122 outside the end cap to engage a washer 124.

The box has pairs of pedestal flanges 130 equally spaced from the center of the box and flaring as indicated at 132. The inner faces of the flanges are hardened for their full height and the sides of the box are also hardened at top and bottom as indicated at 134. The corners of the box are slabbed off on inclines as indicated at 136 to provide clearance for the usual equalizer bars. The top of the box (and also the bottom) is provided with a polygonal recess or seat for an equalizer seat plate. The recess has spaced walls 138 extending across the box and pairs of walls 140 extending lengthwise of the box but discontinuous where the box is slabbed off at 136. The confining walls meet at the corners on a short radius and the recess has a finished annular seating face or pad 142 to engage a similar finished face on a seat plate 144. The seat plate is preferably square except for short bevels at the corners and is of a size to readily enter the recess where it is confined by the side walls against any substantial bodily shifting. The seat plate has flanges 146 to straddle an equalizer bar, a central rounded rib 148 to enter the usual recess in such bar, and seating surfaces 150 at the sides of the rib. The seating surfaces 150 are convexly crowned both longitudinally of the box and transversely. The seat plate is symmetrical about intersecting axes and will fit in either recess, either end first.

The box body is symmetrical about two intersecting axes. Hence, when the bearing surface 12 becomes worn at the top where most of the load comes, the box can be inverted. The sealing ring 38 and the end cap 78 are then both inverted with respect to the box, and the seat plate 144 is placed in the opposite recess. When the inner pair of pedestal flanges 130 becomes worn, the box can be reversed end for end. The sealing ring and the end cap are then interchanged, together with their fastenings.

We claim:

1. In a device of the character indicated, a journal box having a bearing surface, a bearing running on said surface, a shaft journal in said bearing, a thrust block opposing the shaft, a member having an annular portion between the shaft and the box and having a surface acting to guide the bearing, there being a circumferential lubricant groove outside of the guide surface and open to the bearing surface, and means for conducting lubricant from the groove to a point over the thrust block, said means comprising a passage intersecting said circumferential groove and inclining away from the groove and extending to a point over the thrust block, the passage being partitioned off from the shaft and being elongated in a direction away from its intersection with the groove, the elongated passage having closely adjacent side walls near the vertical central plane of the shaft whereby the lubricant entering the passage is retained by the side walls substantially directly above the shaft for gravity conduction to said point over the thrust block.

2. In a device of the character indicated, a journal box having a bearing surface, a shaft journalled in the box, a thrust block opposing the shaft, an end closure for the box and having an annular projection within the box and in close proximity to the bearing surface, the closure having a recess for the thrust block, and the upper portion of the closure having an elongated passage closed on all sides and extending from a point adjacent to the bearing surface to the top of the thrust block; substantially as described.

3. In a device of the character indicated, a journal box having a bearing surface, a shaft journalled in the box, a thrust block opposing the shaft, a reservoir near the top of the thrust block, an oil collecting member near one end of the box and having a portion extending close up to one end of the bearing surface to collect lubricant therefrom, the member having a lubricant conducting passage elongated in a direction away from the bearing surface and extending to a point over said reservoir substantially lengthwise of the shaft over the highest portion thereof whereby the side walls of the elongated passage prevent any substantial movement of the lubricant circumferentially of the shaft, and the thrust block having a drain communicating with said reservoir for draining to the thrust surface of the thrust block all of the lubricant which enters the passage and the reservoir; substantially as described.

4. In a device of the character indicated, a journal box having a bearing surface, a shaft journalled in the box, a thrust block opposing the shaft, a lubricant collecting member having a portion betwen the shaft and the box and extending close to the bearing surface to collect lubricant therefrom, the member having an inclined lubricant passage therethrough to conduct lubricant from the upper portion of the bearing surface towards the upper portion of the thrust block, the passage having its opposite side walls close to the vertical plane of the shaft to prevent movement of the lubricant laterally of the thrust block, the thrust block having a drain leading to a point opposite to the end of the shaft, and means comprising a reservoir near the top of the thrust block and in open communication with the end of the passage and the drain for compelling all of the lubricant to go to the drain from the passage; substantially as described.

5. In a device of the character indicated, a journal box having a bearing surface, a shaft journalled in the box, a thrust block opposing the shaft, a reservoir near the top of the thrust block, a lubricant collecting member having an arcuate projection between the shaft and the upper portion of the box, the arcuate projection having a lubricant collecting groove open to one end of the bearing surface to receive lubricant therefrom, the member having a lubricant passage intersecting the groove and elongated in a direction towards the thrust block and extending to a point over said reservoir, the elongated passage having side walls to prevent movement of the lubricant laterally of the thrust block whereby all of the lubricant entering the passage will be delivered to the reservoir, and the thrust block having a drain communicating with its thrust face and with said reservoir; substantially as described.

HAROLD R. GIBBONS.
OTTO W. YOUNG.

CERTIFICATE OF CORRECTION.

Patent No. 2,150,893. March 21, 1939.

HAROLD R. GIBBONS, ET AL.

It is hereby certified that error appears in the printed specification of the above numbered patent requiring correction as follows: Page 2, first column, line 6, after the word and period "block." insert the following sentence -

> The passage 102 is elongated lengthwise of the box and its side walls prevent spreading of the lubricant circumferentially of the box or laterally of the thrust block so that the lubricant is conducted along the vertical center line of the box to the middle of the thrust block. ;

and that the said Letters Patent should be read with this correction therein that the same may conform to the record of the case in the Patent Office.

Signed and sealed this 2nd day of May, A. D. 1939.

Henry Van Arsdale (Seal)                              Acting Commissioner of Patents.